Figure 1:
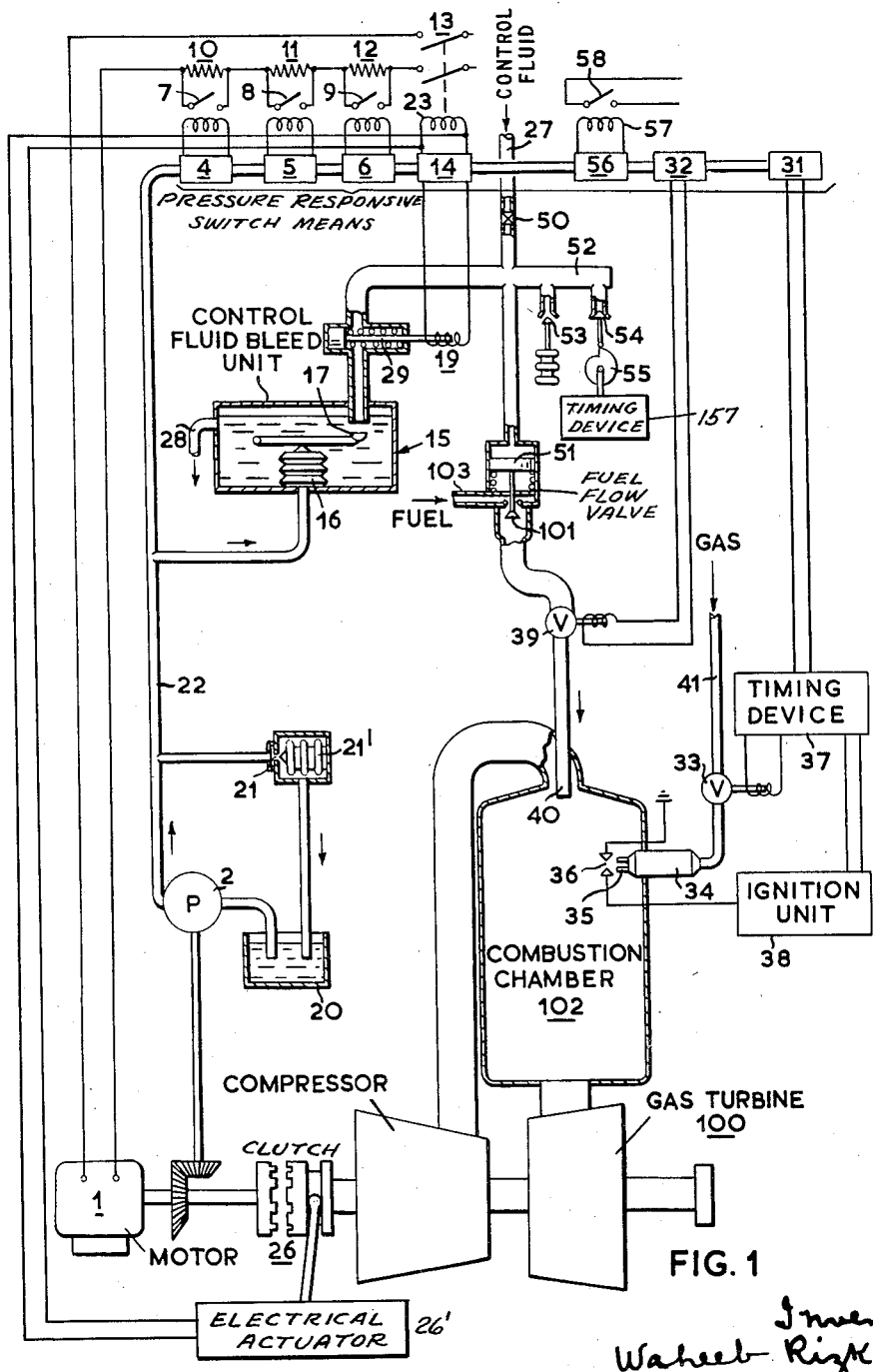

Oct. 9, 1962 W. RIZK 3,057,155
STARTING CONTROL ARRANGEMENTS OF GAS TURBINES
Filed May 9, 1960 2 Sheets-Sheet 2

Inventor:
Waheeb Rizk
By: Stevens, Davis, Miller & Mosher
Attorneys

United States Patent Office 3,057,155
Patented Oct. 9, 1962

3,057,155
STARTING CONTROL ARRANGEMENTS
OF GAS TURBINES
Waheeb Rizk, Rugby, England, assignor to The English Electric Company Limited, London, England, a British company
Filed May 9, 1960, Ser. No. 27,632
Claims priority, application Great Britain May 15, 1959
2 Claims. (Cl. 60—39.14)

The present invention relates to starting control arrangement of gas turbines burning gaseous and/or liquid fuel. Such gas turbines have to be driven up to self-sustaining speed by a starter prime mover, and have to accelerate further under their own power to reach governing speed.

A considerable torque has to be applied to the gas turbine and/or compressor rotor when accelerating the same to self-sustaining speed, and load limiting means have to be provided preventing said starter prime mover from being overloaded. For example, when such turbines are started by an electric starter motor, it is necessary to provide a resistance in the circuit thereof which is gradually reduced to accelerate the starter motor and the gas turbine, without exceeding the safe maximum current through the starter motor windings.

Hitherto electrical systems, for example current-sensitive relays or time switches, have been used to control the switching out of the various resistance stages as the starter motor and turbine accelerate, but such systems have not always proved reliable in service nor easy to match to gas turbine characteristics. It is also necessary to increase gradually the fuel supply to the gas turbine as the speed increases up to governing speed.

It is one of the objects of the present invention to provide a simple and reliable means of switching out the said resistance and of controlling the increase of fuel to a gas turbine during starting and acceleration up to governing speed.

In a starting control arrangement according to the present invention the starter prime mover driving the gas turbine up to self-sustaining speed is coupled to a rotary fluid pressure generator hydraulically connected to means limiting the loading of the said prime mover and reducing their limiting effect as the said prime mover and gas turbine accelerate.

When the said starting prime mover is an electric starter motor, the resistance in the circuit of the said motor is gradually reduced by the said fluid pressure generator as the said motor and gas turbine accelerate. For example the said resistance is composed of individual resistors successively short circuited by pressure sensitive switches controlled by the said fluid pressure generator.

In a starting control arrangement according to the present invention a fluid pressure responsive fuel flow valve biased towards the closing position is controlled by the pressure of a rotary fluid pressure generator coupled to the gas turbine and/or its starter prime mover during the starting period, the said fluid pressure acting on the said fuel flow valve in the sense of opening the same. The said fluid pressure generator is disconnected under the action of the pressure generated by it from the said fuel flow valve by a pressure sensitive means when the said turbine has reached self-sustaining speed. If desired an ignition device for the fuel in the combustion chamber of the gas turbine is controlled by a pressure responsive switch operated by said fluid pressure generator in the course of the starting operation.

Figure 2:
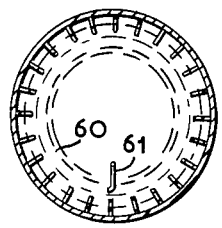
Figure 3:
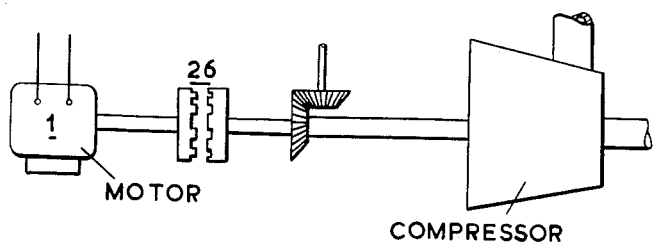

In order that the invention may be clearly understood and readily carried into effect, an embodiment thereof will now be described by way of example with reference to the accompanying drawings in which:

FIG. 1 is an electric and hydraulic circuit diagram of one embodiment of the invention, FIG. 2 is a diagrammatic end elevation in section of a total head device suitable as fluid pressure generator, and FIG. 3 shows a modification of a detail of FIG. 1.

Referring first to FIG. 1, the gas turbine 100 has an electric starter motor 1 connected to it by a disengageable clutch 26. Permanently and mechanically coupled to the starter motor 1 is a fluid pressure generator 2 which draws oil from a sump 20 which may be a separate sump or may form part of the fuel oil or lubricating oil system of the gas turbine.

The output of the fluid pressure generator 2 is connected back to the sump 20 through a restricted orifice 21 controlled by a temperature-sensitive valve operated for example by a bellows 21' filled with a liquid such as turpolene and is also connected by a pressure line 22 to a series of pressure sensitive switches 4, 5 and 6 which operate, by means of relays, the contacts 7, 8 and 9 connected across the starter resistors 10, 11 and 12 of the starter motor 1. The starter motor circuit is connected to an electrical supply through an isolating switch 13. A further pressure sensitive switch 14 operates this isolating switch 13 through a relay 23. The output of the oil pressure generator 2 is also connected to a control fluid bleed unit 15. This unit 15 comprises a bellows 16 controlling an obturator 17 in the control fluid circuit of the gas turbine 100. A solenoid 19 operating a valve 29 spring biased to the open position but capable of isolating said control fluid circuit bleed 15, is connected to a second set of contacts of the pressure switch 14.

When the gas turbine is ready to start, the resistance shorting contacts 7, 8 and 9 are open, the isolator switch 13 is closed and the solenoid operated valve 29 is in the open position. When the starting switch 13 is closed, the electrical circuits are energised and the starter motor 1 commences to rotate, driving the rotor of the gas turbine 100 and the fluid pressure generator 2. As the starter motor 1 accelerates, the pressure of the oil delivered by the fluid pressure generator 2 increases until at a predetermined pressure the pressure sensitive switch 4 closes, closing in turn the shorting switch 7 and short-circuiting the resistor 10. This causes the starter motor 1 to accelerate further until the pressure sensitive switch 5 causes the switch 8 to short-circuit the resistor 11 when the acceleration of the motor 1 is further increased. Similarly the pressure-sensitive switch 6 causes the switch 9 to short-circuit the resistor 12.

In order that the pressure rise from the fluid pressure generator 2 during the acceleration period for example between the response of the switches 4 and 5, may also switch on and ignite the fuel, two further pressure sensitive switches 31 and 32 are connected to the pressure line 22 from the pressure generator 2. When the pressure sensitive switch 31 closes, it energises two circuits through a timing device 37.

The first circuit energises the ignition unit 38 which provides the high tension current necessary to establish an intermittent spark across the spark gap 36 of the igniter 34. The second circuit energises the solenoid valve 33 and admits an ignitable gas from the gas mains 41 to the igniter 34. This gas issues from the nozzle 35 across the spark gap 36 and becomes ignited to form a torch flame. The timing device 37 is arranged to disconnect both circuits after a predetermined period of time, thus cutting off both the spark 36 and the gas supply from 41 and extinguishing the torch flame from the igniter 34.

The timing device 37 resets automatically when the pressure sensitive switch 31 opens.

When the pressure sensitive switch 32 closes, it energises a solenoid valve 39, which admits gaseous or liquid fuel from the main fuel supply 103. The torch flame from the igniter 34 then ignites this main fuel supply after the same is admitted to the combustion chamber 102 through the nozzle 40.

When the starter motor 1 reaches its predetermined maximum speed, the pressure sensitive switch 14 opens the isolator switch 13, disconnecting the starter motor circuit from the current supply.

At this stage, i.e., simultaneously with or shortly before switching off the current to the starter motor 1, the clutch 26 is disengaged either automatically through free wheel action or through an electrical actuator 26' or servomotor controlled by electrical connection to the coil 23 of the pressure sensitive switch 14, in line 22.

Also, while the oil pressure was increasing, the pressure inside the bellows 16 increased, closing the obturator 17 in the oil bleed from line 27 leading to drain 28. The pipe 27 is connected to a source of hydraulic pressure fluid (not shown) and has a restrictor valve 50, downstream of which the said solenoid controlled valve 29 is branched off. The pipe 27 is continued to a fuel flow control servo unit consisting a spring biased piston 51 controlling a fuel flow valve 101 in the main fuel supply 103 to the combustion chamber 102. When the pressure on the piston 51 exceeds the spring bias, the said valve 101 is moved in the opening sense, While the bleed to drain 28 is kept open by the spring biased solenoid controlled valve 29 and by the obturator 17 controlled by the bellows 16, the pressure acting on the servo piston 51 is reduced and the valve 101 is moved in the closing direction by spring bias.

A branch pipe 52 downstream of the restrictor 50 contains a bleeder valve 53 and pressure relief valve 54. The said bleeder valve 53 is operated in a conventional way by devices (not shown) sensitive to gas turbine temperatures and/or pressures, fuel-to-air ratio, etc., and the said pressure relief valve 54 is operated through a cam 55 driven by a timing device 157. In this manner the pressure acting on the servo piston 51 and thus controlling the fuel flow valve 101 is controlled in a conventional way in operation, in addition to the control according to the present invention through the fluid bleed unit 15 as described hereinabove.

When the fluid pressure in the line 22 rises to a predetermined value the pressure sensitive switch 14 acting through solenoid 23 opens the starter motor circuit at switch 13. At the same time it energises the solenoid 19 thereby closing the valve 29. This isolates the servo piston 51 from the control fluid bleed unit 15, and prevents the fluid flow valve 101 from being moved in the closing direction owing to the motor 1 being stopped. The servo piston 51 is thereby left under the exclusive control of the bleeder valve 53 and pressure relief valve 54.

In the pressure line 22 yet another pressure sensitive switch 56 may be incorporated which, for example, through a solenoid 57, controls a switch 58 connected to a trip (not shown) which shuts down the gas turbine 100 in case of the starter motor 1 failing to shut down.

Various modifications of the system described are possible.

For example the said fluid bleed unit 15 acting directly on the control fluid pressure downstream of the restrictor 50 may be replaced by a conventional fluid pressure/air pressure relay (not shown) controlling the air pressure acting on the bleeder valve 53.

The pressure generator 2 in FIG. 1 was assumed to be a conventional positive displacement pump or a centrifugal pump. In these cases the return circuit through the restricted orifice 21 is required. Instead of the temperature-sensitive valve 21' allowing to compensate for variations in viscosity of the control fluid, a conventional sharp edged orifice may be used which is more or less independent of viscosity, or an elongated calibrated bore may be used which is sensitive to viscosity.

Instead of a constant displacement pump or centrifugal pump, a total pressure means as diagrammatically illustrated in FIG. 2 may be used, in which a fluid ring is set up by centrifugal action and the total pressure resulting from velocity head plus centrifugal head is sensed by a probe. In this case the return circuit 21 to the sump 20 may be dispensed with.

As diagrammatically indicated in FIG. 3 the position of the disengageable clutch 26 relative to the motor 1 and pressure generator drive may be reversed. In this case the drive of the pressure generator 2 would be maintained after disengagement of the clutch 26, and the cam operated pressure relief valve 54 may be dispensed with.

The electric starter motor 1 is illustrated in FIG. 1 by way of example as a direct current motor, with the starter resistors 10, 11, 12 arranged in series with the motor. Obviously an alternating current motor could be used instead, in which case the starter resistors would form part of a multiphase wound rotor circuit as usual.

What I claim as my invention and desire to secure by Letters Patent, is:

1. A starting control arrangement for a gas turbine comprising in combination: a starter prime mover during the starting of the said gas turbine in driving connection therewith and driving the same up to self-sustaining speed, a rotary fluid pressure generator in driving connection with the said starter prime mover at least during the starting of the said gas turbine, fluid pressure responsive control means hydraulically connected to the said fluid pressure generator, a combustion chamber in operation discharging combustion products into the said gas turbine, a fuel supply line to the said combustion chamber, a fuel flow valve arranged in the said fuel supply line, hydraulic actuator means controlling the said fuel flow valve, an external source of hydraulic pressure connected to the said hydraulic actuator means, a bleed branched off upstream of the said actuator means, and control valve means responsive to the fluid pressure of the said fluid pressure generator, said control valve means keeping said bleed open below a predetermined fluid pressure of said fluid pressure generating means and closing said bleed responsive to said fluid pressure increasing while the said gas turbine reaches self-sustaining speed.

2. A starting control arrangement as claimed in claim 1, comprising in addition: a second bleed branched off upstream of the said actuator means, a bleeder valve and a pressure relief valve arranged in parallel on the said second bleed, a control device responsive to operational conditions of the gas turbine controlling said bleeder valve, a cam in operative connection to said pressure relief valve, and a timing device in driving connection with said cam.

References Cited in the file of this patent

UNITED STATES PATENTS

| | | |
|---|---|---|
| 765,030 | Moore | July 12, 1904 |
| 1,343,212 | Huey | June 15, 1920 |
| 1,807,280 | Carpenter | May 26, 1931 |
| 2,262,195 | Noack | Nov. 11, 1941 |
| 2,452,298 | Goode | Oct. 26, 1948 |
| 2,559,006 | Clapham | July 3, 1951 |
| 2,617,253 | Fusner | Nov. 11, 1952 |
| 2,632,294 | Wall | Mar. 24, 1953 |
| 2,680,202 | Vintenon | June 1, 1954 |
| 2,808,702 | Dotson | Oct. 8, 1957 |
| 2,862,355 | Davis | Dec. 2, 1958 |

FOREIGN PATENTS

| | | |
|---|---|---|
| 614,341 | Great Britain | Dec. 14, 1948 |
| 731,698 | Great Britain | June 15, 1955 |